Figure 1:
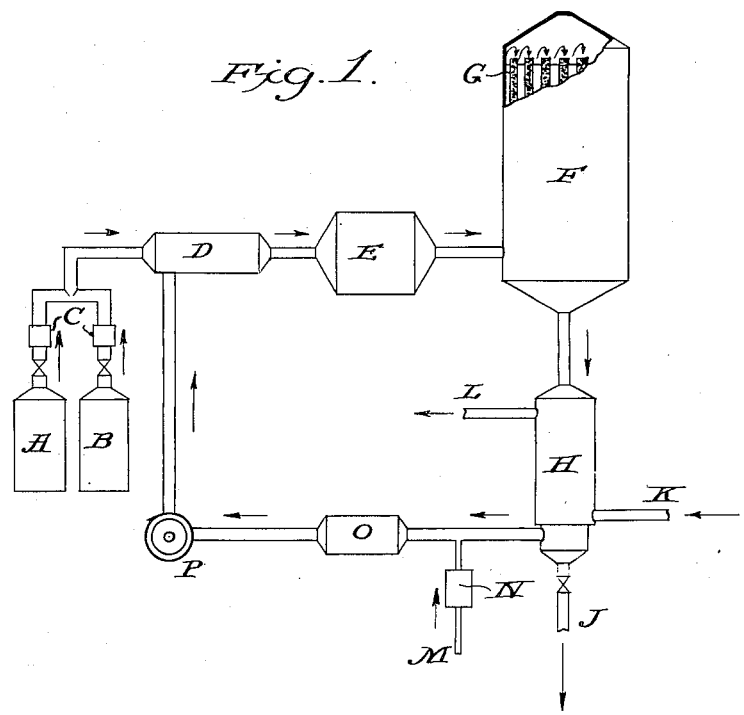

March 1, 1938.  R. H. WILHELM  2,109,873
PROCESS OF NITRATING HYDROCARBONS IN THE VAPOR PHASE
Original Filed Jan. 31, 1936  2 Sheets-Sheet 1

INVENTOR.
RICHARD H. WILHELM
BY
ATTORNEY.

March 1, 1938. R. H. WILHELM 2,109,873
PROCESS OF NITRATING HYDROCARBONS IN THE VAPOR PHASE
Original Filed Jan. 31, 1936 2 Sheets-Sheet 2

INVENTOR.
RICHARD H. WILHELM
BY
ATTORNEY.

Patented Mar. 1, 1938

2,109,873

UNITED STATES PATENT OFFICE 2,109,873

PROCESS OF NITRATING HYDROCARBONS IN THE VAPOR PHASE

Richard Herman Wilhelm, Princeton, N. J.

Application January 31, 1936, Serial No. 61,781
Renewed July 17, 1937

10 Claims. (Cl. 260—142)

The present invention relates to a method of making nitrated cyclic organic compounds, and, more particularly, to a method of producing mononitrobenzene and mononitrotoluenes in the vapor phase.

Heretofore, in the nitration of hydrocarbons, such as benzene and toluene, to the mononitro stage, the usual practice was to subject the hydrocarbon to the action of a mixture of nitric and sulfuric acids in the liquid phase. Although the aforesaid process had many shortcomings, nevertheless, it has been used as the conventional process for nitrating aromatic hydrocarbons. Various attempts were made to replace the aforesaid process. Of these attempts, certain ones involved vapor phase nitration. Thus, the process described in the German Patent No. 207,170 of March 2nd, 1909, granted to Chemische Fabrik Grunau Landshoff und Meyer Akt.-Ges. in Grunau, Mark, Germany, operated in two steps. First, the oxides of nitrogen were absorbed from a dilute air mixture by a weakly basic metallic oxide, such as zinc or copper oxide. The second step was the nitration operation and consisted of placing the salts formed in the first step into an iron tube and passing a mixture of benzene and air through the tube. The temperature was raised to 300° centigrade where nitration of benzene began. If a temperature of 350° C. was exceeded decomposition set in. It is also stated that toluene could be reacted at 370° C. to give ortho and meta nitro toluene in the ratio of 11% to 89%. The aforesaid process had the disadvantage of being a discontinuous one, involving an alternate heating and cooling step as well as an intermittent gas flow cycle. Furthermore, an experimental process for vapor phase nitration was described by Shorulgin and Topchiev, Ber., 67, 1362 (1934). The authors state that if 40 grams of benzene and 200 grams of nitrogen dioxide were independently vaporized in a stream of carbon dioxide and were brought together at 55-60° C. in the absence of ultra violet light for a short vapor phase contact in an unpacked glass vessel and then condensed, all in a period of two hours, 20 grams of mononitrobenzene will result. This process has the object of being non-catalytic and of being conducted at low temperature with a large proportion of $NO_2$ to benzene and with all of the associated shortcomings. Although various proposals were made, none, as far as I am aware, has been wholly satisfactory and successful, particularly when carried into practice on an industrial scale.

I have discovered a process of catalytically nitrating hydrocarbons in the vapor phase which overcomes all of the disadvantages and shortcomings mentioned hereinbefore.

It is an object of the present invention to provide a catalytic process for nitrating hydrocarbons, such as benzene and toluene, to the mononitro stage, which uses the simplest raw materials possible.

A further object of the invention is to provide a catalytic process for nitrating hydrocarbons, such as benzene and toluene, to the mononitro stage which is a continuous one and which utilizes a cyclic system.

The invention likewise contemplates the provision of an apparatus in which the nitration of gaseous hydrocarbons, such as benzene and toluene, both in the gaseous state, may be brought about, especially in contact with a catalyst.

Other objects and advantages of the present invention will become apparent from the following description taken in conjunction with the accompanying drawings, in which:—

Figure 2:
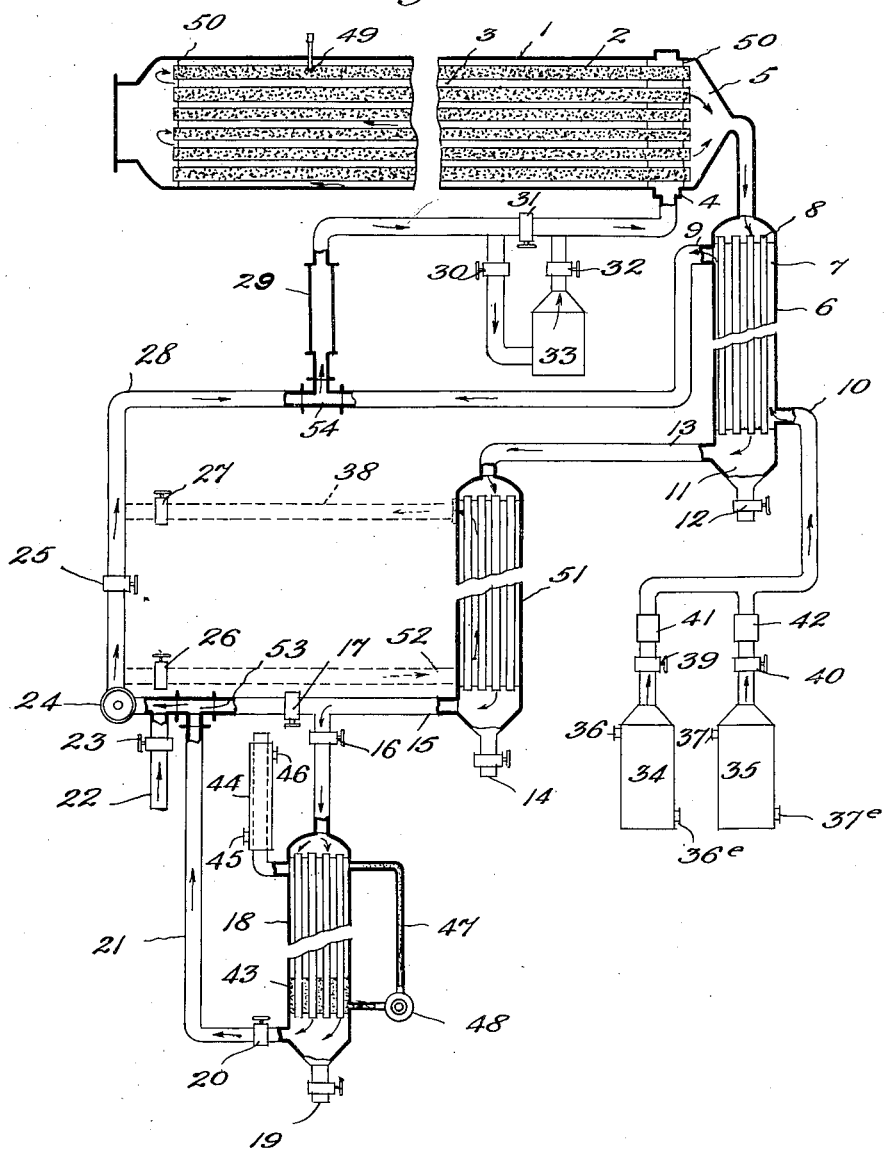

Fig. 1 depicts a diagrammatic view of a flow sheet of a process embodying the present invention; and Fig. 2 illustrates an apparatus capable of carrying the present invention into practice.

Broadly stated, my invention contemplates nitrating benzene and toluene with $NO_2$ which may be obtained from the gases used in the preparation of nitric acid. The use of $NO_2$ directly as a nitrating agent does away with the necessity of first preparing nitric acid. The present invention involves the passage of a gaseous mixture of the hydrocarbon and the $NO_2$ through a bed of silica gel. The mononitro derivative which is formed is separated by an appropriate operation. The residual substances, after treatment with a proper amount of oxygen to restore the oxides of nitrogen, may be recycled through the bed of silica gel. Corresponding to the withdrawal of product, fresh reactants may be introduced into the cycle.

For the purpose of giving those skilled in the art a better understanding of the invention, the following examples will be given.

A mixture of about 26 grams of benzene and about 31 grams of $NO_2$ may be passed continuously, preferably at a constant rate of about 18 grams of reactant mixture per 100 grams of silica gel per hour, in the vapor phase, through about 320 grams of highly active silica gel during a period of about one hour, the silica gel being maintained at a temperature of about 310° C.

The silica gel used was the type generally employed to bring about removal of water vapor from gases, and the gel had the property of being capable of removing such water vapor very actively and effectively. About 12.5 grams of mononitrobenzene were found to have been formed in this process. In addition to this mononitrobenzene, there were found unreacted benzene, $NO_2$ and about 13.9 grams of NO. The latter may readily be oxidized to $NO_2$ in any appropriate manner and then again be used as a nitrating agent. A yield of about 32% with respect to benzene converted to mononitrobenzene, was obtained. The unnitrated benzene was found to be recoverable in greater part.

In another example, about 31 grams of toluene and about 31 grams of $NO_2$ may be passed continuously, preferably at a constant rate, in the vapor phase through about 320 grams of highly active silica gel during a period of about one hour, the silica gel being maintained at a temperature within a range of about 270° C. to about 300° C., and preferably about 275° C. About 3.8 grams of a mixture of mononitrotoluenes were found to have been formed in this process. In addition to these mononitrotoluenes, there were found unreacted toluene, $NO_2$ and some NO. This NO may be oxidized to $NO_2$ and then again be used as a nitrating agent. A yield of about 7% was obtained with respect to toluene converted to nitrotoluenes.

The present process may be carried into practice in any appropriate apparatus, but I prefer to use an arrangement illustrated in the drawings. Thus, the equipment indicated on the flow sheet in Fig. 1 may be used for my vapor phase nitration of benzene and may be arranged in a cyclic system with its attendant advantages. Benzene and nitrogen dioxide may be vaporized in vaporizers A and B, respectively, and the quantity of each reactant may be accurately metered in the meters C. Then both gas streams may be led into a mixing chamber D. From D the reaction gases may be led through a heater E which will add heat in a quantity that may be necessary to keep the entire cyclic nitration system in thermal stability. From E the gaseous reactants may be led to the catalyst chamber F. This may consist essentially of a series of parallel tubes G fitted into a header at each end of the tubes. The silica gel catalyst is placed in the tubes and the reaction gas mixture may be passed through these tubes. The catalyst chamber may be built on heat interchanger principles whereby the incoming reaction gases are heated to a proper temperature by the heat evolved by the nitration reaction. These incoming reaction gases which serve as a cooling fluid, may pass outside of the catalyst tubes and inside of a shell which surrounds the entire bank of catalyst tubes. Baffle plates to provide for an adequate circulation of the cooling fluid may be provided.

After passing through the catalyst tubes, the reaction mixture may be passed through a partial condenser H in which the product, nitrobenzene, is condensed out and withdrawn as at J. The partial condenser may be kept at the requisite temperature by a cooling fluid which may pass in at K and out at L. This cooling fluid may conveniently be air, or the original reaction mixture as it comes from A and B, or other appropriate source. The gases left from the original reaction mixture after passing through the partial condenser will then have a proper amount of oxygen injected into them at M, N being a metering device. The resulting gas stream may then be passed through an oxidation chamber O which is sufficiently large to permit time for the oxidation of NO to $NO_2$ to the desired extent. Following the oxidation chamber, the gases may be passed through a blower P, and finally back into the vapor mixer D. Thus, the cycle will be complete.

In the event that it is desired, all of the products from the catalyst tubes that are condensible may be completely condensed. Benzene, nitrobenzene, water and $NO_2$ could be condensed with comparative ease, NO could be oxidized and then condensed in the form of $NO_2$. The condensed products could then be separated by distillation. The product would thus be recovered and unused benzene and $NO_2$ be reused in the nitration cycle.

Any alternate method of separating the product, nitrobenzene, from the reaction gases that is common to systems of this type may be used. Thus, rather than carrying out the condensation of nitrobenzene alone, the successive condensation of nitrobenzene followed by the condensation of water and benzene either separately or together, may be provided for. If water and benzene are condensed together they may be separated by decantation and the benzene reused.

A preferred form of apparatus is shown in Fig. 2. The apparatus is preferably constructed of material, especially a metal, which will conduct heat readily and will not be corroded by the reacting gases. The reference character (1) denotes a shell of the equipment which contains the catalyst. Hereafter, it will be referred to as the catalyst chamber. The chamber may be erected either horizontally or vertically and preferably contains a plurality of tubes (2), open at each end, and set into tube sheets (50). The catalyst is packed inside the tubes and is prevented from blowing out the ends by small screens. In an alternate form of the apparatus the catalyst may be placed in the space between the tubes. The reaction mixture enters the catalyst chamber at (4) which is an annular ring communicating with the intertube space of the reaction chamber. This incoming gas is led over the catalyst tubes and is caused to flow with a uniform distribution and rapidly by baffles, which are not shown in the drawings. The gases then reach the end of the apparatus and pass back through the inside of the tubes in which the catalyst is located. Reaction takes place there. The heat liberated in the reaction passes in part through the tube walls and heats the incoming gas mixture. The temperature throughout the catalyst chamber as well as the remaining equipment is recorded and read by a plurality of thermocouples or thermometers such as at (49). The diameter of the catalyst chamber, and consequently the number of tubes (2), is a function of the power of the catalyst, but the dimensions of the tubes and their spacing are determined so as to produce with the minimum amount of metal the maximum efficiency from the point of view of obtaining a regular temperature.

The reaction product passes from the reaction chamber to a partial condenser (6). This consists of a plurality of vertical tubes (8) set in tube sheets and surrounded by the wall (6). The incoming product gases pass downward through the tubes and out through the port (13). In their passage downward the gases are cooled by a heat interchange and some of the nitrated product borne in the gas stream is condensed out. This runs down the inside of the tubes and collects in the receiver (12) from which it is drawn from time to time. A fresh mixture of NO₂ and hydrocarbon enters the partial condenser (6) through port (10) and passes upward through the condenser and out through (9). This fresh mixture is heated during that passage and serves as a cooling fluid in the condenser. Under certain conditions all of the product will not condense out in the partial condenser (6). An additional and similar partial condenser (51) is then provided. The product bearing gases in the condenser also pass down through the inside of the tubes and out through (15). Product that is condensed is collected in the receiver (14). The gases leaving the condenser (51) should be substantially free from the nitrated product. The cooling fluid for condenser (51) may be either air or reaction gas which has passed through (18). In either case the cooling fluid will pass into condenser (51) through port (52) and out through (38).

The reaction gases which have been stripped of nitro product in condenser (51) may now flow in a continuous stream toward the blower (24), or more preferably, part or all of the stream may be diverted through condenser (18) later to rejoin the main stream at (53). (18) is a condenser of construction similar to (6) and (51). The gas passes down through the inside of the tubes and water which condenses out collects in the receiver (19). This water may contain some nitric acid which can be concentrated if it is desired. The cooling agent in this case may be a boiling liquid (43) such as benzene. This liquid is caused to boil by the heat which it receives through the tube walls. Provision may be made to circulate the boiling liquid through tube (47) with pump (48) and thus maintain the entire length of the tubes at a substantially constant temperature. An efficient water-cooled condenser (44) with water inlet and outlet (45) and (46), prevents the boiling fluid from escaping to the atmosphere and also removes the heat of vaporization from that fluid.

As an alternate procedure, all of the vapors passing through tube (15) may be passed through condenser (18) and both water and unused benzene may be condensed out. A cooling fluid of proper temperature such as warm water or boiling acetone for the condenser is to be provided in that procedure such that water and benzene will be substantially condensed and nitrogen dioxide will not be appreciably condensed. The condensed water and benzene may be separated by decantation.

The recombined gas stream passes from the joint at (53) and there is fed into it through valve (23) a necessary quantity of oxidizing fluid, to cause the oxidation of NO in the gas stream to NO₂. The oxidizing fluid is preferably oxygen, but air may be used if provision is made elsewhere to bleed off the nitrogen. The oxidizing fluid is metered in carefully through the port (22). The gas may now be passed through a blower (24) which maintains a positive circulation in the system. From the blower the gas may pass through condenser (51) or pass up through duct (28). At T (54) this recycled gas meets and joins a quantity of fresh reactant gas which arrives through duct (9). These gases pass together through the mixing chamber (29) which imparts a spiral motion to and promotes a good mixture to the gases. From the mixing chamber the gases may pass directly back into the reaction chamber (1) through the port (4), or, by closing valve (31) and opening valves (30) and (32) the gas may be caused to proceed through the heater (33) which will supply any makeup heat that may be necessary to maintain the system at a thermal stability.

The volume of the apparatus through which the gas flows following the point of injection of oxygen (22) to the point of entry to the catalyst chamber (4) should be sufficiently large to permit time for the oxidation of NO to NO₂ to the desired extent at the gas flow rate obtaining. If necessary, an oxidation chamber may be inserted in the flow line between the points referred to above to allow for such a time of reaction.

It is within the purview of my invention to operate at pressures other than atmospheric.

Fresh hydrocarbon vapor and NO₂ vapor is supplied from vaporizing chambers (34) and (35). These vapors may in practice come from other operations and that portion of the equipment now being described would be modified accordingly. In the present equipment the liquid NO₂ and hydrocarbon are each vaporized by steam which is led in at ports (36) and (37). The condensed steam is withdrawn through (36e) and (37e). The vaporized NO₂ and hydrocarbon are permitted to flow through the control valves (39) and (40). The amount of each gas that is permitted to flow into the nitrating system in a unit of time is measured in the meters (41) and (42). The loss in weight of containers (34) and (35) may also be used as a control on the amounts of each reactant entering the nitrating system.

Although the present invention has been described in connection with certain preferred embodiments, it is to be noted that the variations and modifications may be resorted to without departure from the spirit and scope of the invention as defined by the appended claims. Thus, in the nitration cycle of the present process, it is to be understood that the term "higher oxides of nitrogen" applies to those oxides of nitrogen with a molecular oxygen-nitrogen ratio numerically greater than one, viz:—nitrogen dioxide (NO₂), nitrogen tetroxide (N₂O₄), nitrous anhydride (N₂O₃), and nitric anhydride (N₂O₅); whereas in the oxidation cycle the term "lower oxides of nitrogen" applies to those known oxides of nitrogen with a molecular oxygen-nitrogen ratio not greater than one, viz:—nitric oxide (NO).

I claim:—

1. A process of nitrating aromatic hydrocarbons in the vapor phase in the presence of a silica gel catalyst which comprises passing a vaporous mixture of an aromatic hydrocarbon to be nitrated and higher oxides of nitrogen with a molecular oxygen-nitrogen ratio numerically greater than one into contact with the catalyst, separating the nitrated hydrocarbons from said vaporous mixture and reusing the remaining gaseous mixture in the first step hereof.

2. A process of nitrating aromatic hydrocarbons in the vapor phase in the presence of a silica gel catalyst which comprises passing a vaporous mixture of an aromatic hydrocarbon to be nitrated and higher oxides of nitrogen with a molecular oxygen-nitrogen ratio numerically greater than one into contact with the catalyst, separating the nitrated hydrocarbon from said vaporous mixture, separating unchanged hydrocarbon from the vaporous mixture, subsequently subjecting the remaining vaporous mixture to oxidation to oxidize the lower oxides of nitrogen, and then reusing said vaporous mixture containing higher oxides of nitrogen together with any unchanged hydrocarbon in the first step hereof.

3. A process of nitrating an aromatic hydrocarbon in the vapor phase in the presence of a catalyst which comprises continuously passing a vaporous mixture containing benzene and nitrogen dioxide (NO₂) in contact with a highly active silica gel while maintaining a temperature of about 300° C. to form nitrobenzene, separating the thus formed nitrobenzene from said vaporous mixture, and reusing the remaining gaseous mixture in the first step hereof.

4. A process of nitrating an aromatic hydrocarbon in the vapor phase in the presence of a catalyst which comprises continuously passing a vaporous mixture containing benzene and higher oxides of nitrogen including nitrogen dioxide in contact with a highly active silica gel while maintaining a temperature of about 300° C. to form nitrobenzene, separating the thus formed nitrobenzene from said vaporous mixture, separating any unchanged benzene from said vaporous mixture, oxidizing the lower oxides of nitrogen in the remaining vaporous mixture, and subsequently reusing said oxidized oxides of nitrogen together with any unchanged benzene, in the first step hereof.

5. A process of nitrating an aromatic hydrocarbon in the vapor phase in the presence of a catalyst which comprises passing a vaporous mixture containing toluene and nitrogen dioxide (NO₂) in contact with a highly active silica gel while maintaining a temperature of about 270° C. to about 300° C. to form nitrotoluene, separating the thus formed nitrotoluene from said vaporous mixture, and reusing the remaining vaporous mixture in the first step hereof.

6. A process of nitrating an aromatic hydrocarbon in the vapor phase in the presence of a catalyst which comprises passing a vaporous mixture containing toluene and nitrogen dioxide in contact with a highly active silica gel while maintaining a temperature of about 275° C. to form nitrotoluene, separating the thus formed nitrotoluene from said vaporous mixture, separating any unchanged toluene from said vaporous mixture, oxidizing the lower oxides of nitrogen in the remaining vaporous mixture, and subsequently reusing said oxidized oxides of nitrogen together with any unchanged toluene, in the first step hereof.

7. A process of nitrating a cyclic hydrocarbon in the vapor phase in the presence of a catalyst which comprises passing a vaporous mixture of a cyclic hydrocarbon to be nitrated and higher oxides of nitrogen in contact with a catalyst separating nitrated cyclic hydrocarbon from said vaporous mixture, and reusing the remaining vaporous mixture in the first step hereof.

8. A process of nitrating a cyclic hydrocarbon in the vapor phase in the presence of a catalyst which comprises continuously passing a vaporous mixture of a cyclic hydrocarbon to be nitrated and higher oxides of nitrogen in contact with a silica gel catalyst, separating the nitrated cyclic hydrocarbon from said vaporous mixture and, from the resulting gaseous mixture, separating unchanged cyclic hydrocarbon, subsequently subjecting the said remaining vaporous mixture to oxidation to oxidize the lower oxides of nitrogen, and then reusing said vaporous mixture containing oxides of nitrogen together with any unchanged cyclic hydrocarbon in the first step hereof.

9. A process of nitrating a hydrocarbon in the vapor phase which comprises passing a vaporous mixture of the hydrocarbon to be nitrated and higher oxides of nitrogen in contact with a silica gel catalyst and separating the nitrated hydrocarbon from the remaining vaporous mixture.

10. A process of nitrating a hydrocarbon in the vapor phase which comprises continuously passing a vaporous hydrocarbon to be nitrated and higher oxides of nitrogen in contact with a silica gel catalyst, separating the nitrated hydrocarbon from the said vaporous mixture, then separating any unchanged hydrocarbon from the said vaporous mixture, subsequently subjecting the lower oxides of nitrogen in the said vaporous mixture to oxidation, and reusing the oxidized oxides of nitrogen together with any unchanged hydrocarbon in the first step hereof.

RICHARD HERMAN WILHELM.